May 2, 1939.  W. H. BISHOP  2,156,615
SLIDING ROOF FOR VEHICLES
Filed Dec. 4, 1936  3 Sheets-Sheet 1
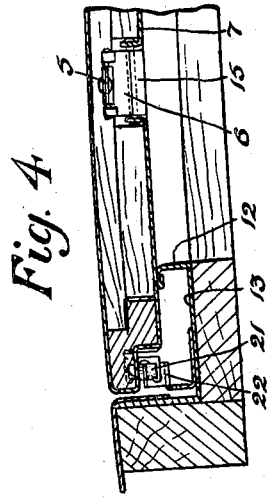
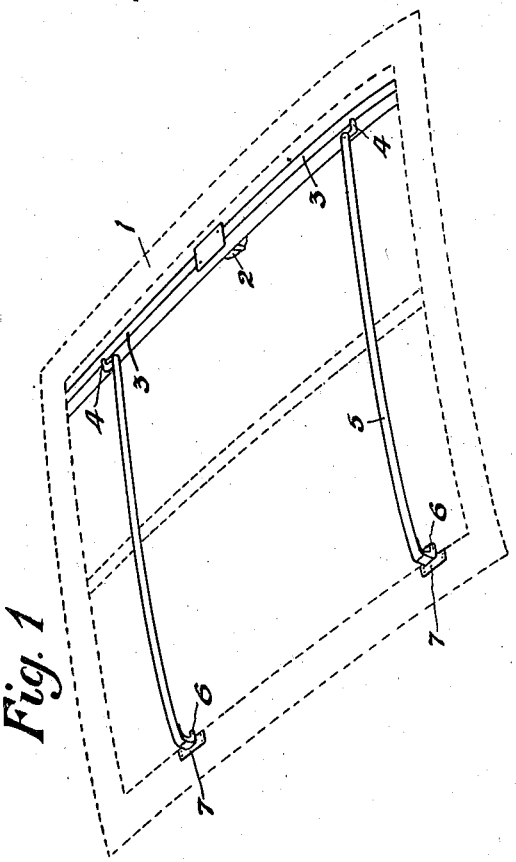
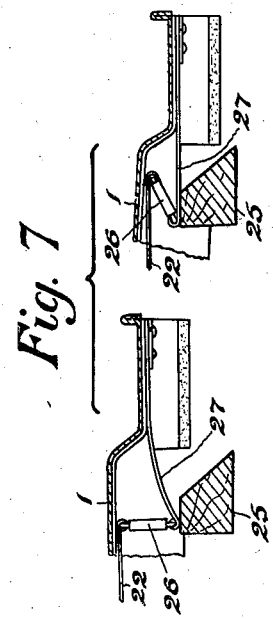
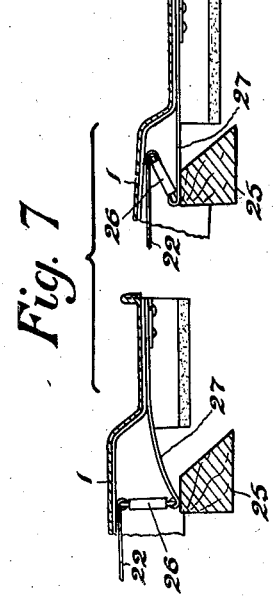
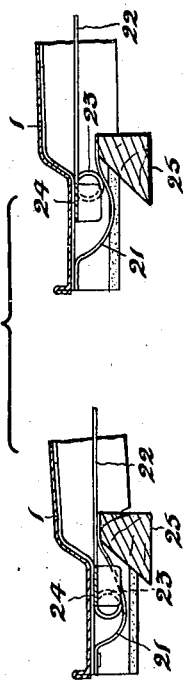
INVENTOR,
William Henry Bishop
By Andrew Wilson
His Attorney.

May 2, 1939. W. H. BISHOP 2,156,615
SLIDING ROOF FOR VEHICLES
Filed Dec. 4, 1936 3 Sheets-Sheet 2
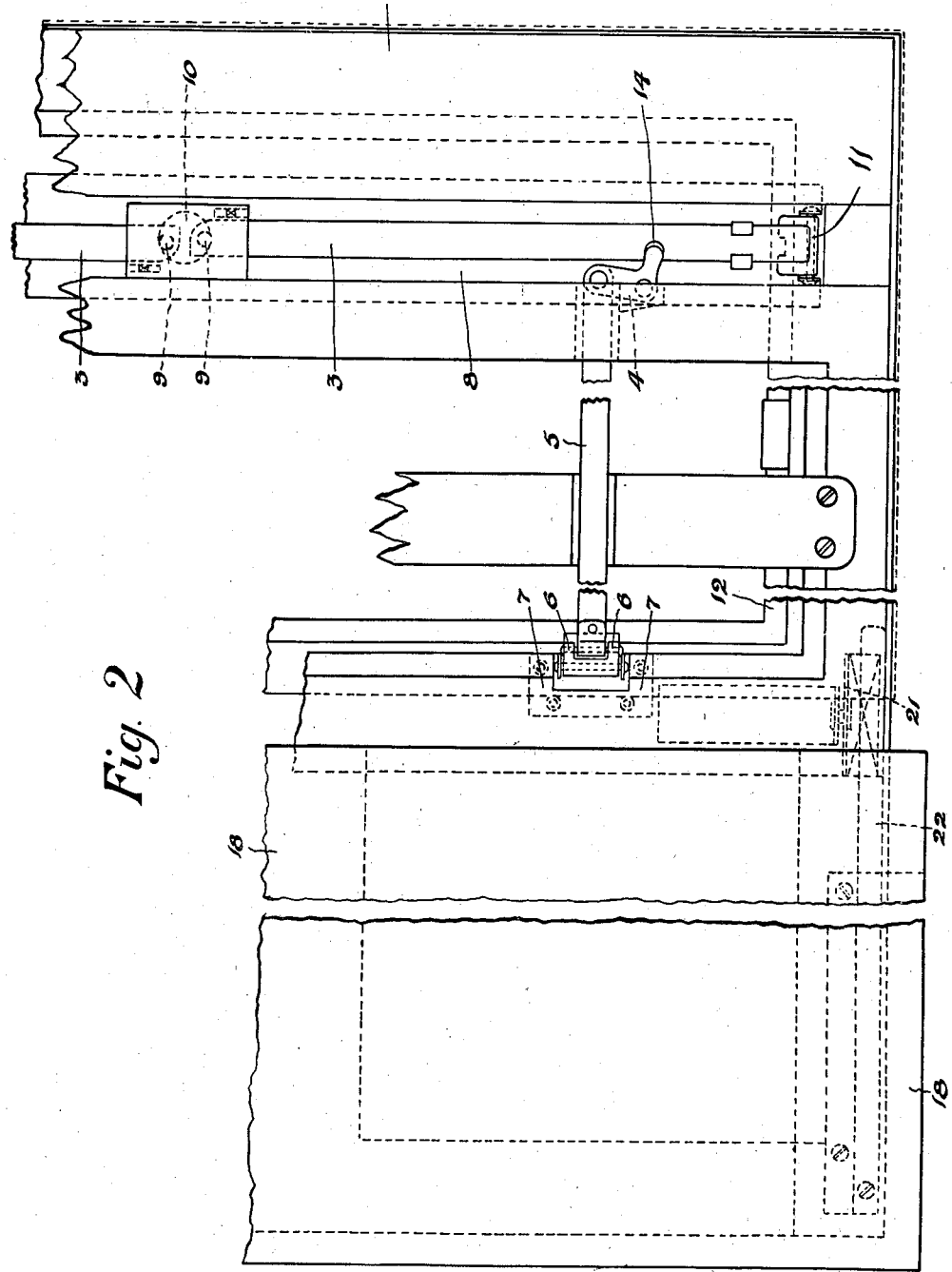

May 2, 1939. W. H. BISHOP 2,156,615
SLIDING ROOF FOR VEHICLES
Filed Dec. 4, 1936 3 Sheets-Sheet 3
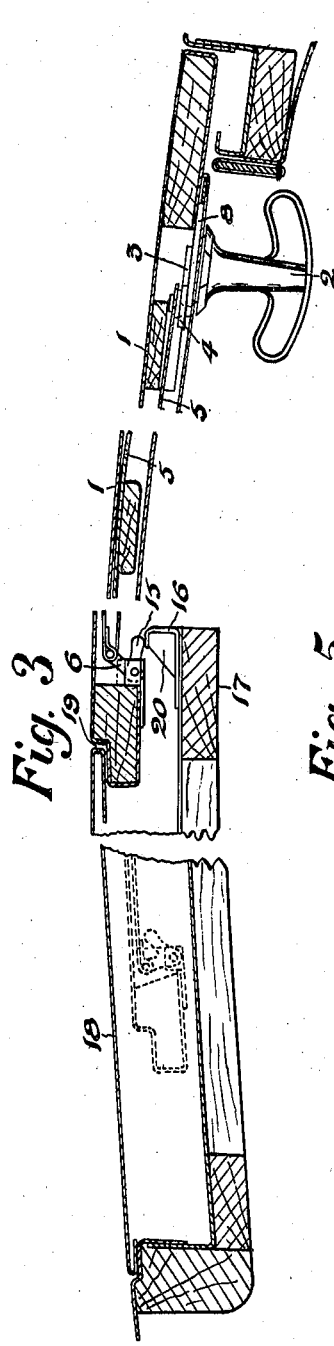
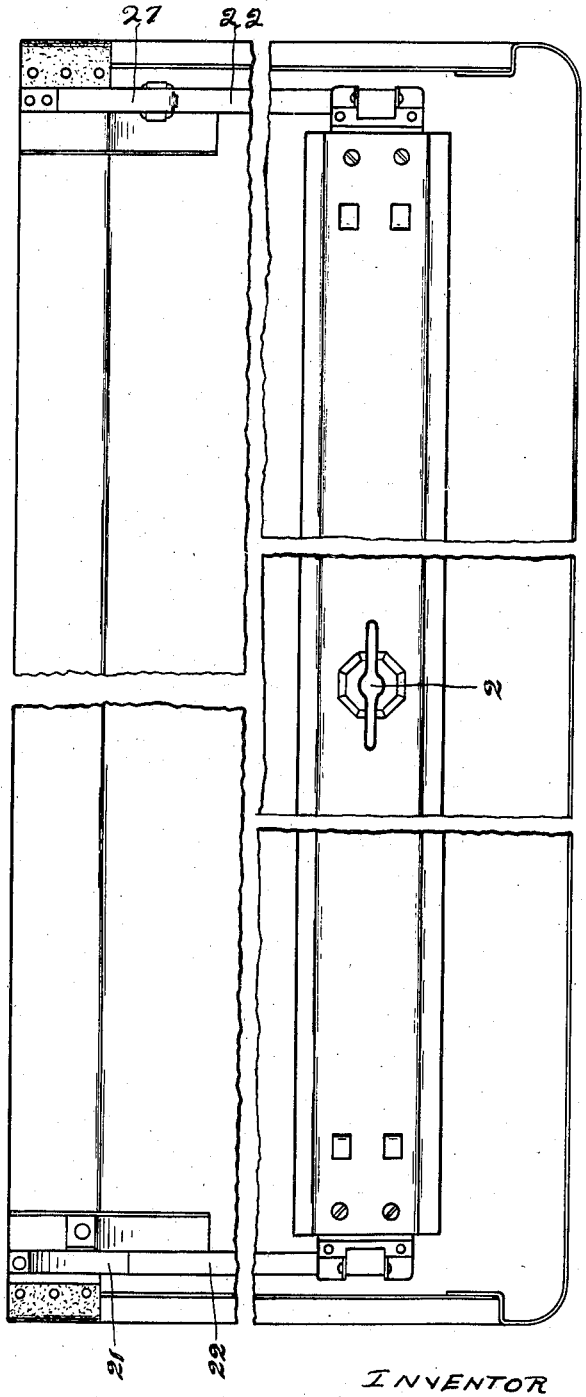
INVENTOR
William Henry Bishop
BY Andrew Wilson
His Attorney.

Patented May 2, 1939

2,156,615

UNITED STATES PATENT OFFICE

2,156,615

SLIDING ROOF FOR VEHICLES

William Henry Bishop, Birmingham, England

Application December 4, 1936, Serial No. 114,174
In Great Britain December 14, 1935

9 Claims. (Cl. 296—137)

This invention relates to improvements in sliding roofs for vehicles of the type in which a longitudinally slidable panel for covering an opening in one part of the roof is adapted when opened to slide under a fixed cover or canopy over the other part of the roof.

When the panel is in the closed position it is desirable that the edge adjacent to the fixed cover or canopy should be raised into a position substantially flush with the fixed canopy and various means for doing this have been proposed such as inclined ramps or guides up which the edge of the panel slides as it reaches the closed position.

The object of my invention is to provide improved means for raising an edge of the panel as it reaches the closed position whereby the panel is positively lifted in a vertical or substantially vertical direction and an extremely neat and weather-tight joint can be readily made between the edge of the panel and the adjacent edge of the canopy.

According to my invention when a sliding panel is moved into the closed position the edge adjacent to the fixed cover or canopy is brought up into a position substantially flush with the canopy by means of one or more lifting members such as pivoted bell-cranks, wedges or similar members which are actuated by operation of a handle or lever which preferably also serves to lock the panel in the closed position. The bell-cranks or the like may be mounted on the roof adjacent to one end of the opening and engage with a cross-member at one end of the sliding panel but preferably they are mounted on a cross-member at the end of the panel and engage with a fixed surface at the end of the opening. Where the panel is fitted with a locking device adjacent to one end and consisting of catches or detents adapted to engage with longitudinal members at the sides of the roof opening and operated from a central handle, the bell-cranks or the like for raising the other end of the panel may be linked to and operated simultaneously with the locking mechanism so that when the panel has been moved into the closed position actuation of the handle simultaneously locks the panel against longitudinal movement and raises its one end into a position flush with the fixed part of the roof. The bell-cranks or the like may be operated from the locking mechanism by links, wires or cables as desired.

Alternatively the locking mechanism may be located at the same end of the panel as the lifting mechanism and it and the lifting mechanism can be operated by linkage or the like from a handle located at any convenient point in the panel.

As the movement of the rear edge of the panel is vertical and is positive a neat and weather-tight joint can be readily made between the vertically movable edge of the sliding panel and the adjacent edge of the fixed canopy without the necessity of providing co-operating inclined faces on these parts.

When the panel is unlocked prior to opening it the edge adjacent the canopy is automatically lowered at the same time so that the panel can slide freely under the canopy.

Further, as the raising of the edge of the panel is independent of the longitudinal movement of the panel no additional resistance is offered to the final part of the closing movement of the panel and there is no possibility of rubbing contact between the sliding panel and the canopy at any stage of the panel movement.

Some practical applications of my invention have been illustrated by way of example in the accompanying drawings in which:

Figure 1 is a diagrammatic perspective view showing the general layout of combined locking and lifting mechanism as applied to a composite or built-up sliding roof construction.

Figure 2 is a half plan of a practical layout, the covering of the sliding panel being omitted to show the mechanism.

Figure 3 is a longitudinal section on the line 3—3 of Figure 2.

Figure 4 is a transverse section on the line 4—4 of Figure 2.

Figure 5 is an inverted plan of a sliding panel for use with an all-metal roof construction showing two alternative forms of lifting mechanism.

Figure 6 comprises two fragmentary sections of the lifting mechanism shown on the left of Figure 5, showing the panel in the lowered and raised positions.

Figure 7 comprises two similar sections of the mechanism shown on the right of Figure 5.

In Figure 1 there is shown diagrammatically a sliding panel 1 having mounted on it adjacent to its front edge locking mechanism consisting of a central operating handle 2 which when partially rotated causes lateral movement of two opposed bars 3 having at their outer ends locking means for engaging with longitudinal members at the sides of the roof opening to lock the panel in any desired position. Engaging with each bar is one arm of a pivoted bell-crank 4, and the other arm is connected to the front end of a longitudinally extending link 5. The rear end of this link is coupled to one arm of a bell-crank 6 pivoted about a horizontal axis on a bracket 7 mounted on the panel adjacent to its rear edge. As the panel reaches the closed position the bell-cranks 6 ride into alignment with abutments on the fixed part of the roof, and when the handle 2 is turned to lock the panel the links 5 are drawn forwardly and the bell-cranks 6 are rocked over to raise the rear edge of the panel which is thus brought up flush with the fixed rear canopy.

In the practical arrangement shown in Figures 2, 3 and 4 the same reference numerals are used for the corresponding parts.

The laterally movable locking bars 3 are slidably mounted in a sheet metal housing 8 on the panel adjacent to its front edge and their inner ends are engaged with eccentric pegs 9 on a disc 10 rotated through 90° by the handle 2 to lock or unlock the panel. The outer ends of the bars 3 engage with cranked locking members 11 which are pivotally mounted in the housing 8, and on outward movement of the bars these members are rocked over to engage with a flange 12 on a sheet metal tray 13 which extends around the opening in the roof. Adjacent to the outer end of each bar 3 is a notch 14 in which engages one arm of a bell-crank 4 pivoted about a vertical axis on the housing, and the other arm of each bell-crank is pivotally connected to the front end of a longitudinally movable link 5. The rear end of each link is pivotally connected to one arm of a bell-crank 6 which is pivotally mounted about a horizontal axis in a bracket 7 on the rear cross-member of the panel.

When the panel is in the closed position shown in Figure 3 the free arms 15 of the bell-cranks 6 overlie abutments 16 on a fixed cross-member 17 at the rear end of the roof opening, and when the handle 2 is rotated to lock the panel the links 5 are drawn forwardly so that the bell-cranks 6 are rocked over and the free arms 15 are brought into a horizontal position and, bearing on the abutments 16, raise the rear edge of the panel into a position flush with the fixed canopy 18 over the rear part of the roof.

To open the panel the handle 2 is turned in the reverse direction which unlocks the panel and rocks over the bell-cranks 6 in the opposite direction to allow the rear edge of the panel to drop sufficiently for it to slide under the canopy 18 as the panel is moved rearwardly. In the open position of the panel its rear edge occupies the position shown in dotted lines in Figure 3. As the movement of the rear edge of the panel is substantially vertical a close-fitting weather-tight joint can readily be made between the rear edge of the panel and the canopy, the rear cross-member of the panel preferably being formed with a step or rebate 19 to receive the front edge of the canopy. The abutments 16 with which the bell-cranks 6 engage may be formed by a flanged strip mounted on the cross-member 17 or separate abutment blocks may be provided, and preferably the rear face of the abutment is inclined as shown at 20 to ensure that the arms 15 of the bell-cranks ride into correct engagement with the abutments.

The rear edge of the panel is slidably guided by means of runners 21 travelling on longitudinal guides 22, and to allow for the vertical movement of the panel these guides may be stepped or cranked upwardly at their forward ends, or the runners 21 may be carried by short links pivoted on the panel. Alternatively the guides 22 may be free at their front ends so that they can flex in a vertical plane.

The modified construction shown in Figures 5 and 7 is designed for use with an all-steel roof construction in which the sliding panel and the roof are formed from sheet steel pressings. In this construction the lifting members and their operating mechanism are located at the sides of the panel so that they are concealed in the flanged channels or trays which extend along each side of the openings and in which the panel is guided.

In the arrangement shown in Figure 6 and on the left of Figure 5 a curved spring strip 21 is secured at its rear end to the underside of the rear edge of the panel and its free end projects forwardly and is pressed upwardly by the resilience of the strip. A metal strip or link 22 which is moved longitudinally by actuation of the locking handle 2 is curled round at its rear end to form a cam 23 which engages between the strip 21 and the panel and is guided between downwardly extending lugs on a member 24 secured to the panel. In the rearward position of the link 22, when the panel is unlocked, the cam 24 lies between the curved part of the strip 21 and the panel as shown on the left in Figure 6 and the rear edge of the panel is lowered to allow the panel to slide under the canopy. When the panel is closed and locked the cam is drawn forwardly as shown on the right in Figure 6 and forces the free end of the strip 21 downwardly away from the panel, and the thrust of the free end of the strip against a fixed abutment 25 raises the rear edge of the panel vertically.

In the alternative construction shown in Figure 7 the rear end of the link 22 is pivotally connected to the upper end of a rigid wire loop 26 and the lower end of the loop is pivotally connected to the free end of a blade spring 27 secured at its rear end to the underside of the panel.

When the panel is unlocked the resilience of the spring 27 holds the parts in the position shown on the right of Figure 7 and the panel is lowered and can slide under the canopy. When the panel is locked the link 22 draws the upper end of the loop 26 forwardly as shown on the left in Figure 7 and the lower end of the link is forced away from the panel to bear against the abutment 25 and raise the rear edge of the panel.

In an alternative construction the links actuated from the locking mechanism may be connected to wedge members which are longitudinally slidable in the rear cross-member of the panel and are adapted to engage with abutments on the fixed part of the roof so that the wedges are moved in one direction and the rear edge of the panel will be raised and as they are moved in the other direction it will be lowered.

It will be understood that while the above description is concerned with sliding roofs in which the opening is at the front of the roof the same construction can equally well be applied to a roof in which the opening is at the rear of the roof and the panel slides forwardly to uncover the opening. In that case the lifting mechanism would be arranged to lift the front edge of the roof into a position flush with a fixed cover or canopy over the front part of the roof when the panel had been moved rearwardly into the closed position.

I claim:

1. A sliding roof for vehicles comprising an opening in one part of the roof, a fixed canopy over the other part of the roof, a substantially rigid, longitudinally slidable panel for covering the opening and adapted when opened to slide under the fixed canopy, movable members mounted on the panel adjacent to one end, fixed abutments adjacent one end of the opening with which abutments said members co-operate when the panel is in the closed position, and handle-actuated means for changing the position of said movable members relative to the panel and thereby forcing said members vertically against said abutments to raise the end of the panel carrying the members into a position substantially flush with the fixed canopy.

2. A sliding roof for vehicles comprising an opening in one part of the roof, a fixed canopy over the other part of the roof, a rigid, longitudinally slidable panel for covering the opening and adapted when opened to slide under the fixed canopy, bell-cranks pivoted on the panel adjacent one end, fixed abutments with which said bell-cranks are aligned when the panel is in the closed position and handle-operated means for rocking over said bell-cranks in one direction to raise the end of the panel vertically into a position substantially flush with the fixed canopy and in the other direction to allow the panel to drop and slide under the canopy.

3. A sliding roof for vehicles comprising an opening in one part of the roof, a fixed canopy over the other part of the roof, a longitudinally slidable panel for covering the opening and adapted when opened to slide under the fixed canopy, resilient members mounted on the underside of the panel adjacent one end, fixed abutments on the roof with which said members come into alignment when the panel is in the closed position, and handle-operated means for forcing said resilient members away from the panel and against said abutments to raise the end of the panel into a position substantially flush with the fixed canopy.

4. A sliding roof for vehicles comprising an opening in one part of the roof, a fixed canopy over the other part of the roof, a rigid, longitudinally slidable panel for covering the opening and adapted when opened to slide under the fixed canopy, laterally movable members mounted on the panel adjacent one end, means for locking the panel against longitudinal movement associated with said members, a handle for actuating said members, longitudinally movable links mounted on the panel and actuated by movement of said members, and lifting means mounted on the panel adjacent the other end and actuated by said links to raise that end of the panel vertically into a position flush with the fixed canopy when the panel is in the closed position and the handle is operated to actuate the laterally movable members to lock the panel, said lifting means allowing the panel to drop and slide under the canopy when the handle is operated in the reverse direction to unlock the panel.

5. A sliding roof for vehicles comprising an opening in one part of the roof, a fixed canopy over the other part of the roof, a rigid, longitudinally slidable panel for covering the opening and adapted when opened to slide under the fixed canopy, fixed channels extending along each side of the roof opening below the level of the roof, fixed abutments in said channels, lifting members mounted directly on the sliding panel vertically at each side and coming into alignment with said abutments when the panel is in the closed position, and manually operated means embodying relatively movable parts for actuating said lifting members to lift one end of the panel into a position substantially flush with the fixed canopy.

6. A sliding roof for vehicles comprising an opening in one part of the roof, a fixed canopy over the other part of the roof, fixed and stationary guides mounted on the roof and extending along each side of said opening and under said canopy, a rigid, longitudinally slidable panel travelling directly on said guides and adapted when opened to slide under said canopy, manually operated lifting means embodying relatively movable parts positioned on each side of the fore-and-aft median line of the panel for positively and vertically raising one end only of said panel when it has been moved into the closed position to bring that end of the panel into a position substantially flush with the fixed canopy, and a common manually actuated member for operating said lifting and locking means.

7. A sliding roof for vehicles comprising an opening in one part of said roof, a fixed canopy over the other part of said roof, fixed and stationary guides mounted on the roof and extending along each side of said opening and below said canopy, a rigid, longitudinally slidable panel travelling directly on said guides and adapted when opened to slide under said canopy, means embodying relatively movable parts mounted on said panel for locking the panel against longitudinal movement, lifting means embodying relatively movable parts positioned on each side of the fore-and-aft median line of the panel for positively and vertically raising one end only of said panel when it has been moved into the closed position to bring that end of the panel into a position substantially flush with the fixed canopy, and a common manually actuated member for simultaneously operating said locking means and said lifting means.

8. A sliding roof for vehicles comprising an opening in one part of the roof, a fixed canopy over the other part of the roof, stationary guides secured to the roof and extending along each side of said opening and under said canopy, a substantially rigid, longitudinally slidable panel traveling directly on said guides and adapted when opened to slide under said canopy, movable members mounted on said panel adjacent one end thereof and extending on each side of the fore-and-aft median line of the panel, stationary abutments with which said movable members come into alignment when the panel is in the closed position, and a common manually-actuated means for forcing said movable members against said abutments to raise positively and substantially vertically one end only of the panel to bring that end of the panel into a position substantially flush with the fixed canopy.

9. A sliding roof for vehicles comprising an opening in one part of the roof, a fixed canopy over the other part of the roof, stationary guides secured to the roof and extending along each side of said opening and under said canopy, a substantially rigid, longitudinally slidable panel traveling directly on said guides and adapted when opened to slide under said canopy, movable members mounted on said panel adjacent one end thereof and extending on each side of the fore-and-aft median line of the panel, stationary abutments with which said movable members come into alignment when the panel is in the closed position, laterally movable locking members mounted on the panel and adapted to engage parts associated with the guides for locking the panel against longitudinal movement, and common manually actuated means for simultaneously forcing said movable members on the panel against said abutments to raise positively and substantially vertically one end only of the panel to bring that end of the panel into a position substantially flush with the canopy and for operating said locking members.

WILLIAM HENRY BISHOP.